(12) United States Patent
Huici et al.

(10) Patent No.: US 9,648,126 B2
(45) Date of Patent: May 9, 2017

(54) EFFICIENT CACHING IN CONTENT DELIVERY NETWORKS BASED ON POPULARITY PREDICTIONS

(71) Applicant: NEC Europe Ltd., Heidelberg (DE)

(72) Inventors: Felipe Huici, Dossenheim (DE);
Mohamed Ahmed, Heidelberg (DE);
Sofia Nikitaki, Darmstadt (DE);
Saverio Niccolini, Neckargemuend (DE)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 14/261,509

(22) Filed: Apr. 25, 2014

(65) Prior Publication Data

US 2015/0312367 A1 Oct. 29, 2015

(51) Int. Cl.
*H04L 29/08* (2006.01)

(52) U.S. Cl.
CPC ...... *H04L 67/2842* (2013.01); *H04L 67/1097* (2013.01)

(58) Field of Classification Search
CPC .... H04L 67/28; H04L 67/109; H04L 67/2842
See application file for complete search history.

(56) References Cited

U.S. PATENT DOCUMENTS

| 8,321,521 B1* | 11/2012 | Raciborski | .......... H04L 67/1097 |
| | | | 709/213 |
| 8,868,066 B2* | 10/2014 | Harris | ............... H04W 28/0289 |
| | | | 370/214 |
| 8,886,742 B2* | 11/2014 | Crowe | ................ H04L 67/2847 |
| | | | 709/213 |
| 8,886,769 B2* | 11/2014 | Thibeault | ........... H04L 65/4084 |
| | | | 709/219 |
| 8,949,161 B2* | 2/2015 | Borst | .................. G06F 17/3048 |
| | | | 706/45 |
| 8,949,535 B1* | 2/2015 | Hunter | .................. G06F 11/073 |
| | | | 711/119 |
| 9,161,080 B2* | 10/2015 | Crowe | ................ H04L 67/2842 |
| 2006/0037037 A1* | 2/2006 | Miranz | ............. H04N 7/17318 |
| | | | 725/2 |
| 2010/0070700 A1* | 3/2010 | Borst | .................. G06F 17/3048 |
| | | | 711/113 |
| 2010/0318484 A1* | 12/2010 | Huberman | ............. G06Q 30/02 |
| | | | 706/46 |

(Continued)

OTHER PUBLICATIONS

InnovationQ—NPL search results, Jan. 3, 2017.*

(Continued)

*Primary Examiner* — Thomas Dailey
*Assistant Examiner* — Ruth Solomon
(74) *Attorney, Agent, or Firm* — Leydig, Voit & Mayer, Ltd.

(57) ABSTRACT

A method for caching objects at one or more cache servers of a content delivery network (CDN) includes: determining, by a processor, attributes of objects of a set of objects; calculating, by the processor, an efficiency metric for each object of the set of objects based on the attributes of each object, wherein the attributes of each object include an expected future popularity associated with the object; selecting, by the processor, a subset of objects from the set of objects for caching based on calculated efficiency metrics; and caching the subset of objects at the one or more cache servers.

12 Claims, 3 Drawing Sheets

(56) References Cited

U.S. PATENT DOCUMENTS

| | | | | |
|---|---|---|---|---|
| 2012/0159558 A1* | 6/2012 | Whyte | ............... | H04N 21/222 725/95 |
| 2012/0198075 A1* | 8/2012 | Crowe | ............... | H04L 67/2842 709/226 |
| 2013/0018978 A1* | 1/2013 | Crowe | ............... | H04L 67/2842 709/214 |
| 2014/0179301 A1* | 6/2014 | Harris | ............... | H04W 28/0289 455/422.1 |
| 2014/0207912 A1* | 7/2014 | Thibeault | ............ | H04L 67/2847 709/219 |

OTHER PUBLICATIONS

Using Early View Patterns to Predict the Popularity of YouTube Videos, Henrique Pinto, Jussara M. Almeida, Marcos A. Gonçalves, WSDM'13, Feb. 4-8, 2013, pp. 365-374.*

Distributed Caching Algorithms for Content Distribution Networks, Sem Borst, Varun Gupta, Anwar Walid, IEEE INFOCOM 2010.*

Predicting when not to predict, IEEE Computer Society, Karl Brandt, Darrell D.E. Long, Ahmed Amer, Proceeding Mascots '04 Proceedings of the the IEEE Computer Society's 12th Annual International Symposium on Modeling, Analysis, and Simulation of Computer and Telecommunications Systems, pp. 419-426, Oct. 4-8, 2004.*

Wang, et al., "Optimal Cache Allocation for Content-Centric Networking", $21^{st}$ IEEE Int. Conference on Network Protocols, Dec. 2013.

Borst, et al., "Distributed Caching Algorithms for Content Distribution Networks", $29^{th}$ Conference on Information Communications, Dec. 2010.

Amble, et al., "Content-Aware Caching and Traffic Management in Content Distribution Networks", $29^{th}$ Conference on Information Communications, Dec. 2011.

Famaey, et al., "Towards a predictive cache replacement strategy for multimedia content", Journal of Network and Computer Applications, Jan. 2013, pp. 219-227.

* cited by examiner

Input: $N$ set of all objects
Attributes of object $o_i$ : $p_i$ : expected number of hits over a time horizon, $\sigma_i$ : uncertainty, $s_i$ : size}
System's constraints: $C$: available cache size, $W$ accepted risk envelope
Output: set $\mathcal{D}$ of the objects that satisfy the constraints Initialize: Sort the objects according to $e$ { $o_1 = \max_j e_j$, $o_N = \min_j e_j$ : $1 \leq j \leq N$} and
$c = 0, w = 0$
while $w < W$ and $c < C$ do
  $j = j + 1$
  $w = w + \sigma_j$
  $c = c + s_j$
  if $w < W$ and $c < C$ then
    $\mathcal{D} \rightarrow \{o_j\}$
  end if
end while

FIG. 3

EFFICIENT CACHING IN CONTENT DELIVERY NETWORKS BASED ON POPULARITY PREDICTIONS

BACKGROUND

Content distributors (Google, Akamai, Limelight, Level3, etc.) preside over a multi-billion dollar business built on content delivery networks (CDNs), massively distributed networks of content caches. For example, in 2010 Akamai reported that its CDN had over 60,000 servers in 1,000 distinct networks spread over 70 countries. This growth is driven by an increase in demand for multimedia traffic and the use of mobile devices, resulting in a need to provide infrastructure that supports a good quality of experience for content consumers (e.g., low buffering times). It is expected that the demand for video and other multimedia traffic will continue to increase, as will the need for CDNs to deliver such traffic.

One of the building blocks of CDNs is the content caching algorithms that decide which content to cache, and when and where to cache it. Considerations of content caching algorithms include accuracy (how well they capture the content usage patterns) and complexity (how quickly they return an acceptable answer and how simple they are to realize). Conventional content caching algorithms rely on simple approaches such as least recently used (LRU), least frequently used (LFU) or first-in first-out (FIFO). These provide a simple, quick mechanism for deciding which content to cache, but are far from the optimal.

On the other hand, conventional solutions that have attempted to define an optimal solution have ended up being computationally prohibitive, and have been impracticable in real-world scenarios.

SUMMARY

In an embodiment, the invention provides a method for caching objects at one or more cache servers of a content delivery network (CDN). The method includes: determining, by a processor, attributes of objects of a set of objects; calculating, by the processor, an efficiency metric for each object of the set of objects based on the attributes of each object, wherein the attributes of each object include an expected future popularity associated with the object; selecting, by the processor, a subset of objects from the set of objects for caching based on calculated efficiency metrics; and caching the subset of objects at the one or more cache servers.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 is a screenshot of a segment of pseudo-code illustrating an exemplary content caching procedure according to an exemplary embodiment.

DETAILED DESCRIPTION

Embodiments of the invention provide systems and methods for content caching that takes advantage of knowledge regarding expected user demand for content (i.e., the expected future popularity of such content) to select which content to place in a cache such that it maximizes the number of cache hits (i.e., requests received by a particular content cache for an object that is actually stored at the cache). The selection considers the size of content objects to be stored in the cache and/or the uncertainty associated with expected future content popularity so as to optimize the contents of the cache in terms of achieving a relatively high hit ratio without requiring prohibitively complicated computations.

Content caching according to certain embodiments of the invention may be characterized as looking to expected user demand for a set of content (e.g., multimedia data or other data available in a CDN) and selecting objects from the set of content for storage into one or more caches so as to cache the objects with highest expected user demand while taking into account size and/or uncertainty associated with each object. For example, a large object with high expected demand may be passed over in favor of two medium-sized objects with lesser expected demand than the large object. In another example, an object with high expected future demand but high uncertainty as to that expected future demand may be passed over in favor of an object with lesser expected future demand but low uncertainty as to that expected future demand.

Figure 1:
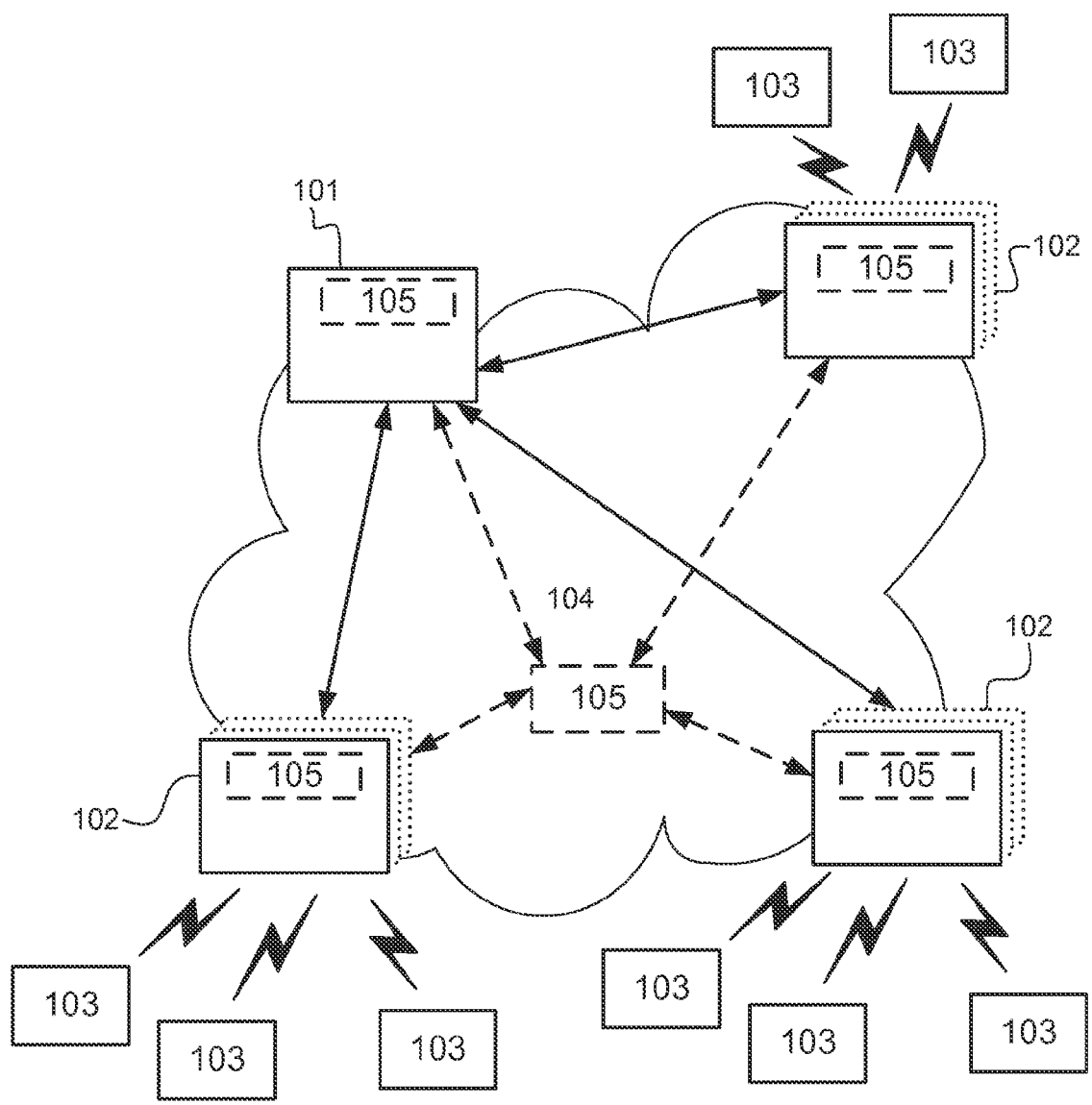
FIG. 1 is a block diagram that illustrates an exemplary CDN environment suitable for embodiments of the invention.

FIG. 1 illustrates components of a CDN including a content origin 101, data centers including one or more cache servers 102, and a plurality of computing devices 103 (such as end user personal computers, laptops, tablets, mobile phones, etc.). The content origin 101 is connected to the cache servers 102 in a CDN across a network 104 (e.g., the Internet), and computing devices 103 connect to cache severs 102 at various geographic locations to efficiently retrieve content provided by the content origin 101 via the cache servers 102.

By keeping copies of frequently accessed content (or content expected to be frequently accessed) from the content origin 101 at particular cache servers 102 or groups of cache servers 102, the computing devices 103 are able to achieve an improved user experience via quicker access and, for example, in the case of streaming video, shorter buffering times. Control of what is stored at each of the cache servers 102 or group of cache servers 102 is provided by a controller 105 associated with the cache server and/or group of cache servers. In one exemplary embodiment, a controller 105 is implemented locally at each data center and controls what content from the content origin is maintained at the one or more cache servers of that data center. In another exemplary embodiment, centralized and/or distributed control is provided via a remote controller 105 (for example, at the content origin 101 or a standalone controller 105) that provides instructions as to what is to be stored to the cache servers of a particular data center (which may or may not be implemented in combination with local control logic provided by a local controller).

It will be appreciated that servers of the content origin 101 and the cache servers 102, as well as the computing devices 103, include processors and non-transitory processor-readable mediums (e.g., RAM, ROM, PROM, volatile, nonvolatile, or other electronic memory mechanism). Operations performed by these components of the CDN and computing devices 103 are carried out according to processor-executable instructions and/or applications stored and/or installed on the non-transitory processor-readable mediums of their respective computing devices. It will further be appreciated that the components of the CDN and computing devices 103 include suitable communications hardware for communicating over a wireless network, for example, a cellular or landline communications network and/or wirelessly via the Internet.

Figure 2:
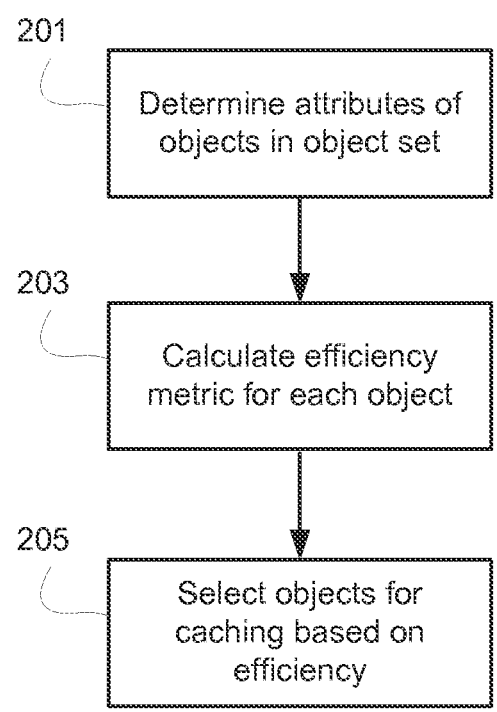
FIG. 2 is a flowchart illustrating an exemplary process for content caching in an exemplary embodiment.

FIG. 2 is a flowchart illustrating an exemplary process for selecting objects to cache in accordance with an exemplary embodiment. Taking a set of N objects as input (from which a subset of objects to cache will be selected), attributes of the objects in the object set are determined at stage 201. These attributes include, for example, for an object $o_i$, an estimated future popularity value (e.g., $p_i$, corresponding to an expected number of hits over a time horizon), an uncertainty (e.g., $\sigma_i$), and the size of each object (e.g., $s_i$). These attributes may be determined, for example, by analyzing the content (or a subset thereof) stored at the content origin and/or by receiving the attribute information from the content origin.

At stage 203, an efficiency metric (e.g., $e_i$) is determined for each object of the set of objects. The efficiency metric takes into account the attributes of the object and may further take into account certain constraints, such as, for example, an available cache capacity/size (e.g., C) and/or an accepted risk envelope (e.g., W). Then, based on the efficiency metrics corresponding to the objects of the set of N objects, an optimal subset of the objects are selected for caching at stage 205. This selection takes into account the size and/or uncertainty associated with each objects, as well as the object's expected future popularity, while being constrained overall by the available capacity of a cache and/or a maximum tolerable uncertainty.

When selecting the set of objects to cache, a decision is made based on an expectation as to future events. Conventional reactive algorithms such as LRU and LFU build on the assumption that the future is best described by the current state of the system. This is a practical simplification that trades accuracy in order to avoid (1) the difficulty of predicting the future state of events, especially in short timescales and (2) the complexity of designing and executing a mechanism that accounts for the future information in a timely fashion (e.g., if it takes 10 seconds to calculate a solution that is only valid for the next 5 seconds, then the solution is of little or no practical use).

Unlike conventional reactive algorithms, embodiments of the invention utilize a predicted content popularity estimation associated with an error or uncertainty (i.e., a confidence interval), in order to select between possible candidate objects to be cached. Whereas standard reactive algorithms ignore the locality in user requests (both temporal and spatial), a popularity prediction algorithm builds locality to predict the future state of events with some uncertainty, expressed in the confidence interval. The predictor utilized by embodiments of the invention considers the history of the requests of each object and then fits the object to a specific model and predicts the expected future popularity of that object under a confidence interval according to the model. The variance associated with the expected future popularity is higher with respect to objects for which there is little historical data, and lower with respect to objects for which more historical data is known. This allows embodiments of the invention to account for situations where, for example, an object may have high expected future popularity according to the popularity prediction algorithm, but that high expected future popularity suffers from large fluctuations or low confidence. An exemplary popularity prediction algorithm usable in embodiments of the invention is described in Mohamed Ahmed, Stella Spagna, Felipe Huici and Saverio Niccolini, "A Peek into the Future: Predicting the Evolution of Popularity in User Generated Content," WSDM (Web Search and Data Mining), February 2013, which is hereby incorporated by reference in its entirety.

A particular illustrative example, applicable for example to caching of video content where interactions take place over a relatively large time scale (seconds, minutes and hours), is provided as follows. Given a set of objects and their expected number of hits over some future time interval, the information is used to populate a content cache. The caching policy is defined with respect to a cache with capacity C and a set of N objects, such that each object of the set $o_i$ is characterized as $o_i(p_i, \sigma_i, s_i)$, whereby $p_i$ defines the expected object popularity in some time interval, $\sigma_1$ is the variance of the expectation, and $s_i$ is the size of the object. The policy aims to select a subset of objects to cache from the set of N objects that maximizes cache hits according to expected future popularity (while being constrained by available capacity C and a risk envelope W).

The cache policy may be represented by the following set of equations:

$$\max_x \sum_i^N p_i \cdot x_i,$$

$$\text{subject to } \sum_{i=1}^N s_i \cdot x_i \leq C$$

$$\sum_{i=1}^N \sigma_i \cdot x_i \leq W$$

$$x_i \in \{0, 1\}, \forall 1 \leq i \leq N$$

where $x_i$ is a binary variable corresponding to each object (i.e., $x_i=1$ for an object selected to be cached), and W defines a risk envelope around the expect number of hits (i.e., when W is large, less consideration is given to the confidence in the expectation of the popularity). W defines the risk threshold that determines the tolerance of the expected uncertainty. The risk threshold is inversely proportional to the risk sensitivity level and is determined by the variation of the expected popularity. The lower bound of W is defined as the minimum variance of the expected popularity while the upper bound is the sum of the variances of the objects. The risk sensitivity threshold is correlated with the available infrastructure (i.e., the available cache size) such that, for example, as the capacity of cache increases, it becomes more acceptable to cache objects with relatively higher uncertainty associated therewith. The choice of the value for W is based on a tradeoff between expected performance versus reliability (e.g., a lower value for W enhances reliability but may prevent certain objects having high expected future probability from being cached).

Because the equations above in effect define a Knapsack problem, solving the problem to determine a precisely optimal solution is computationally difficult and impractical to implements. Embodiments of the invention instead utilize an efficiency metric $e_i$ as criteria for selecting objects to cache. In one example, the efficiency metric for each object is a function of the available cache capacity C, risk envelope W, and attributes of each object $o_i$, as follows:

$$e_i = f(C, W, s_i, p_i, \sigma_i)$$

Specifically, in one example, the efficiency metric represents a preference for objects that are expected to attract the most hits relative to each unit of size and the uncertainty associated there with (i.e., the risk induced by each object), as expressed in the following formula:

$$e_i = \frac{p_i}{\frac{s_i}{C} + \frac{\sigma_i}{W}}.$$

In this form, the expected future popularity of each object $p_i$, is normalized according to the space it consumes (relative to the available capacity C) and the amount of risk it induces in terms of uncertainty (relative to the risk envelope W).

One particular way to implement this caching policy is illustrated in FIG. 3, which is a screenshot of pseudo-code corresponding to one exemplary process of content caching in an embodiment of the invention. The content caching process sorts/ranks the objects according to their efficiency in a decreasing order and fills the cache with the set of objects that have the maximum utility until the cache is full and the uncertainty constraint is satisfied.

Inputs into a caching policy include consideration of a set of N objects and the attributes of each object $o_i$ of that set of objects (including expected future popularity, uncertainty, and size), as well as overall system constraints including available cache size C and acceptable risk envelope W. The process outputs an optimal set D composed of objects with relatively high expected future probability that satisfies the constraints.

The process includes calculating an efficiency metric e for each object and then sorting the objects according to their calculated efficiency metrics (such that the objects, originally in order $o_{i,1}$ through $o_{i,N}$ are now in a new order $o_{j,1}$ through $o_{j,N}$ where $o_{j,1}$ has the highest e value and $o_{j,N}$ has the lowest e value). The objects are then added to the set D from $o_{j,1}$ through $o_{j,N}$ so long as cumulative uncertainty counter w and cumulative size counter c do not exceed the maximum constraints W and C. Once the addition of a new object would cause a maximum constraint to be exceeded, that object is not added to set D, and set D is output as the set of all object that have been added so far.

It will be appreciated that the process depicted in FIG. 3 is merely exemplary, and other manners of implementation of the caching policies described herein according to embodiments of the invention are possible without departing from the inventive principles.

While the invention has been illustrated and described in detail in the drawings and foregoing description, such illustration and description are to be considered illustrative or exemplary and not restrictive. In general, embodiments of the invention aim to maximize the expected utility of caching a given content object, with respect to the risk associated with caching the object in favor of others, subject to an available space constraint and an overall risk envelope. Other constraints may be included as well, such as constraints based on Service Level Agreements (SLAs) or metrics relating to Quality of User Experience. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for caching objects at one or more cache servers of a content delivery network (CDN), the method comprising:

determining, by a processor, attributes of objects of a set of objects;

calculating, by the processor, an efficiency metric for each object of the set of objects based on the attributes of each object, wherein the attributes of each object include an expected future popularity associated with the object and an uncertainty of the expected future popularity associated with the object, wherein calculating the efficiency metric for each object of the set of objects is subject to a risk envelope constraint corresponding to a tolerance level with respect to uncertainty of future popularity;

selecting, by the processor, a subset of objects from the set of objects for caching based on calculated efficiency metrics; and caching the subset of objects at the one or more cache servers.

2. The method according to claim 1, wherein the attributes of each object further include a size of the object.

3. The method according to claim 2, wherein calculating the efficiency metric for each object is further based on an available cache capacity constraint.

4. The method according to claim 3, wherein the efficiency metric is calculated according to the following equation:

$$e_i = \frac{p_i}{\frac{s_i}{C} + \frac{\sigma_i}{W}}.$$

wherein $e_i$ is the efficiency metric for an object $o_i$, $p_i$ is the expected future popularity of the object $o_i$, $s_i$ is the size of the object $o_i$, $\sigma_i$ is the uncertainty corresponding to the expected future popularity of the object $o_i$, C is the available cache capacity constraint, and W is the risk envelope constraint.

5. A non-transitory, processor-readable medium having processor-executable instructions stored thereon for caching objects at one or more cache servers of a content delivery network (CDN), the processor-executable instructions, when executed by a processor, causing the following to be performed:

determining attributes of objects of a set of objects;

calculating an efficiency metric for each object of the set of objects based on the attributes of each object, wherein the attributes of each object include an expected future popularity associated with the object and an uncertainty of the expected future popularity associated with the object, wherein calculating the efficiency metric for each object of the set of objects is subject to a risk envelope constraint corresponding to a tolerance level with respect to uncertainty of future popularity;

selecting a subset of objects from the set of objects for caching based on calculated efficiency metrics.

6. The non-transitory processor-readable medium according to claim 5, wherein the attributes of each object further include a size of the object.

7. The non-transitory processor-readable medium according to claim 6, wherein calculating the efficiency metric for each object is further based on an available cache capacity constraint.

8. The non-transitory processor-readable medium according to claim 7, wherein the efficiency metric is calculated according to the following equation:

$$e_i = \frac{p_i}{\frac{s_i}{C} + \frac{\sigma_i}{W}}.$$

wherein $e_i$ is the efficiency metric for an object $o_i$, $p_i$ is the expected future popularity of the object $o_i$, $s_i$ is the size of the object $o_i$, $\sigma_i$ is the uncertainty corresponding to the expected future popularity of the object $o_i$, C is the available cache capacity constraint, and W is the risk envelope constraint.

9. A content delivery network (CDN) system for caching objects at one or more cache servers, comprising:

a controller, comprising a processor and a non-transitory processor-readable medium, configured to:

determine attributes of objects of a set of objects;

calculate an efficiency metric for each object of the set of objects based on the attributes of each object, wherein the attributes of each object include an expected future popularity associated with the object and an uncertainty of the expected future popularity associated with the object, wherein calculating the efficiency metric for each object of the set of objects is subject to a risk envelope constraint corresponding to a tolerance level with respect to uncertainty of future popularity; and select a subset of objects from the set of objects for caching based on calculated efficiency metrics; and the one or more cache servers, configured to cache the subset of objects.

10. The system according to claim 4, wherein the attributes of each object further include a size of the object.

11. The system according to claim 10, wherein calculating the efficiency metric for each object is further based on an available cache capacity constraint.

12. The system according to claim 11, wherein the efficiency metric is calculated according to the following equation:

$$e_i = \frac{p_i}{\frac{s_i}{C} + \frac{\sigma_i}{W}}.$$

wherein $e_i$ is the efficiency metric for an object $o_i$, $p_i$ is the expected future popularity of the object $o_i$, $s_i$ is the size of the object $o_i$, $\sigma_i$ is the uncertainty corresponding to the expected future popularity of the object $o_i$, C is the available cache capacity constraint, and W is the risk envelope constraint.

* * * * *